United States Patent [19]

Yoshida et al.

[11] Patent Number: 5,490,052
[45] Date of Patent: Feb. 6, 1996

[54] SWITCHING POWER SUPPLY

[75] Inventors: Koji Yoshida, Neyagawa; Nobuyoshi Nagagata, Takatsuki; Takuya Ishii, Suita, all of Japan

[73] Assignee: Matsushita Electric Industrial Co., Ltd., Osaka, Japan

[21] Appl. No.: 53,525

[22] Filed: Apr. 26, 1993

[30] Foreign Application Priority Data

Apr. 24, 1992 [JP] Japan ................................. 4-106328
May 20, 1992 [JP] Japan ................................. 4-127073

[51] Int. Cl.⁶ ................................................ H02M 3/28
[52] U.S. Cl. .......................... 363/15; 363/21; 363/95; 363/97; 363/131
[58] Field of Search ............................. 363/15, 16, 20, 363/21, 95, 97, 131

[56] References Cited

U.S. PATENT DOCUMENTS

| | | | |
|---|---|---|---|
| 4,353,112 | 10/1982 | Rietveld et al. | 363/16 |
| 4,464,709 | 8/1984 | Barter | 363/16 |
| 4,535,399 | 8/1985 | Szepesi | 363/97 |
| 4,692,851 | 9/1987 | Attwood | 363/16 |
| 4,959,764 | 9/1990 | Bassett | 363/16 |
| 5,126,931 | 6/1992 | Jitaru | 363/21 |
| 5,146,394 | 9/1992 | Ishii et al. | 363/16 |
| 5,159,541 | 10/1992 | Jain | 363/131 |
| 5,173,846 | 12/1992 | Smith | 363/20 |
| 5,363,289 | 11/1994 | Jacobs | 363/21 |

*Primary Examiner*—Jeffrey L. Sterrett
*Attorney, Agent, or Firm*—Ratner & Prestia

[57] ABSTRACT

A switching power supply supplies a regulated output voltage for an electronic apparatus in industrial or commercial use and suppresses generation of a spike voltage and a spike current due to a transformer, and a recovery voltage of a rectifying diode due to switching and it results in reduction of noise interference and power loss. A series connection of a first switching means and a second switching means repeating on/off action alternately is connected to a d-c source. A series connection of a first capacitor and a primary winding of a transformer is connected in parallel with the second switching means. An induced voltage in a secondary winding is supplied to an output through a rectifying/filtering means. A series resonance current in a closed circuit comprising the first capacitor and a leakage inductance suppresses spike voltage, spike current, and recovery voltage of the rectifying diode.

6 Claims, 5 Drawing Sheets

FIG. 1
PRIOR ART

FIG. 2(a) Vds
PRIOR ART

SWITCHING
DEVICE 4

FIG. 3
PRIOR ART

FIG. 4(a) Vds PRIOR ART

FIG. 6(a) Vds1
FIG. 6(b) I11
FIG. 6(c) Vg1
FIG. 6(d) I12
FIG. 6(e) Vg2
FIG. 6(f) I2
FIG. 6(g) ϕ

1

SWITCHING POWER SUPPLY

BACKGROUND OF THE INVENTION

1. Field of the Invention

This invention relates to a switching power supply which supplies a stabilized d-c d-c voltage to industrial or commercial electronic apparatus.

2. Description of the Prior Art

According to a demand or electronic apparatus with smaller size, higher performance, less power consumption, and lower cost, switching power supplies with smaller size, higher stability of d-c output voltage, higher efficiency, and lower cost have been strongly requested.

Two types of switching power supplies are explained below.

FORWARD type

Figure 1:
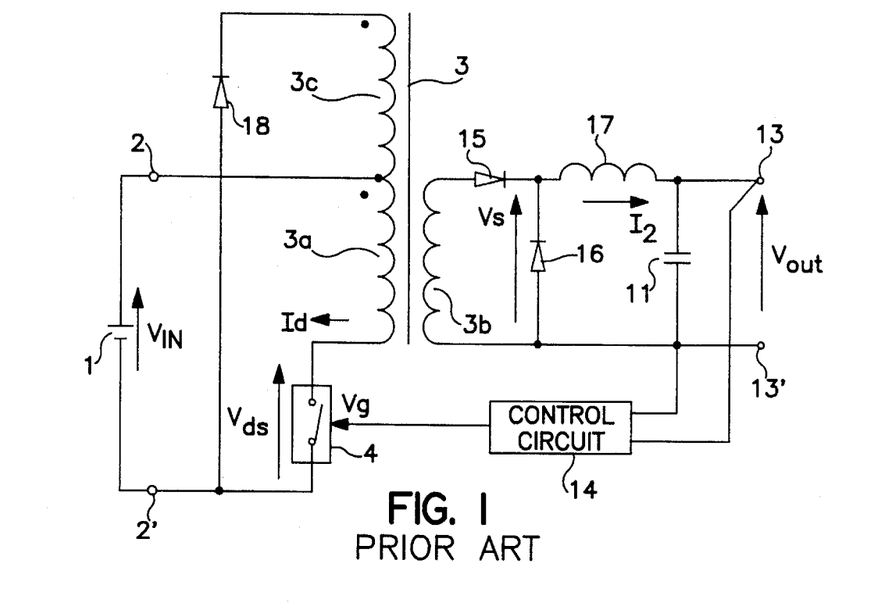
FIG. 1 is a circuit diagram of a first example of a switching power supply in accordance with the prior art.

FIG. 1 is a circuit diagram of a "Forward type" switching power supply in accordance with the prior art. In FIG. 1, 1 is a d-c source which is usually obtained by filtering after rectifying of commercial a-c voltage or a battery. The terminals 2 and 2' of the d-c source 1 are a positive side and a negative side, respectively. 3 is a transformer having a primary winding 3a, a secondary winding 3b, and a reset winding 3c. A terminal of the primary winding 3a is connected to the positive side 2 of the d-c source 1 and another terminal is connected to the negative side 2' of the d-c source 1 via a switching device 4.

A terminal of the secondary winding 3b is connected to the positive terminal 13 of the d-c output via a rectifying diode 15 and aninductor 17 and another terminal of the secondary winding 3b is connected to the negative terminal 13' of the d-c output.

A terminal of the reset winding 3c is connected to the positive terminal of the d-c source 1 and another terminal is connected to the negative terminal of the d-c source 1 via a diode 18. The switching device 4 is switched by a signal from a control circuit 14 and applies and cuts the d-c input voltage to the primary winding 3a of the transformer 3. The diode 15 leads an induced voltage in the secondary winding 3b when the switching device 4 is on to the inductance 17.

A clamping diode 16 is on when the diode 15 is off and makes the negative side of the voltage induced in the secondary winding 3b zero volt. The inductance 17 supplies d-c current to the output terminal 13–13' by filtering the voltages through the diodes 15 and 16. A filtering capacitor 11 is connected between the output terminals 13 and 13' and holds the voltage averaged by the inductor 17 and itself.

The control circuit 14 detects the voltage across the output terminals 13 and 13' and changes an on/off duty ratio of the switching device 4 so that the output voltage is held constant. The diode 18 clamps flyback pulse induced in the reset winding 3c when the switching device 4 turns to off, resets a magnetic flux of the transformer 3, and absorbs a spike voltage.

FIG. 2(a) to (d) illustrate the waveforms in the switching power switching device 4, (b) is a current waveform Id which flows in the switching device 4, (c) is an on/off signal Vg of the control circuit 14, and (d) is the voltage waveform Vs which is applied to a terminal of the inductance 17.

When the switching device 4 turns to on at the time t1 by the on/off signal Vg, a spike current flows in the switching device 4.

This is due to a charging and discharging current to a distributed capacitance such as interwinding capacitances and an interlayer capacitance and a discharging current of a parasitic capacitance of the switching device 4. This spike current induces increased noise, decreased reliability and increased power loss.

When the switching device 4 turns on and Vds becomes small enough, the input voltage Vin is applied to the primary winding 3a of the transformer 3 and a voltage (Vin/n) is induced at the secondary winding 3b and the diode 15 becomes on. Where, n is a turn-ratio of the primary winding 3a to the secondary winding 3b. When the diode 15 becomes on, the diode 16 becomes off and the voltage across the diode 16 Vs becomes (Vin/n) and the current in the inductor 17 flows into a load.

Therefore, in the primary winding 3a, a sum of the primary current (Io/n) converted from the current Io in the secondary winding 3b and an exciting current of the primary winding 3a. When the switching device 4 turns to off at the time t2 by the on/off signal Vg, a spike voltage is induced in the primary winding 3a due to a leakage inductance. This spike voltage becomes noise and power loss.

When a flyback voltage is induced in the reset winding 3c and the diode 18 becomes on, the input d-c source is applied across the reset winding 3c. As the turn-ratio of the reset winding 3c to the primary winding 3a is made as to (1 to 1), a voltage of (2×Vin) appears across the switching device 4, and in the secondary winding 3b a voltage which gives reverse bias to the diode 15 is induced. Therefore, the diode 15 becomes off and the diode 16 becomes on by the current of the inductor 17. Consequently, the voltage across the diode 16 becomes 0. At the same time, a recovery voltage appears across the diode 15 and current and voltage ringings are generated which causes noise and power loss. When the current of the reset winding 3c becomes 0 at the time t3, the diode 18 becomes off and the voltage across the primary winding 3a becomes 0 and the d-c source voltage Vin is applied across the switching device 4.

As no voltage is induced in he secondary winding 3b at this time, the diode 15 holds off state and the diode 16 holds on state. When the switching device 4 turns to on by the on/off signal Vg from the control circuit 14, the d-c source voltage Vin is applied across the primary winding 3a and then the voltage (Vin/n) appears across the secondary winding 3b, the diode 15 turns to on, and the diode 16 turns to off. At this time, a recovery voltage is generated also in the diode 16 and current and voltage ringings are generated and they make noise and power loss.

Figures 2A, 2D:
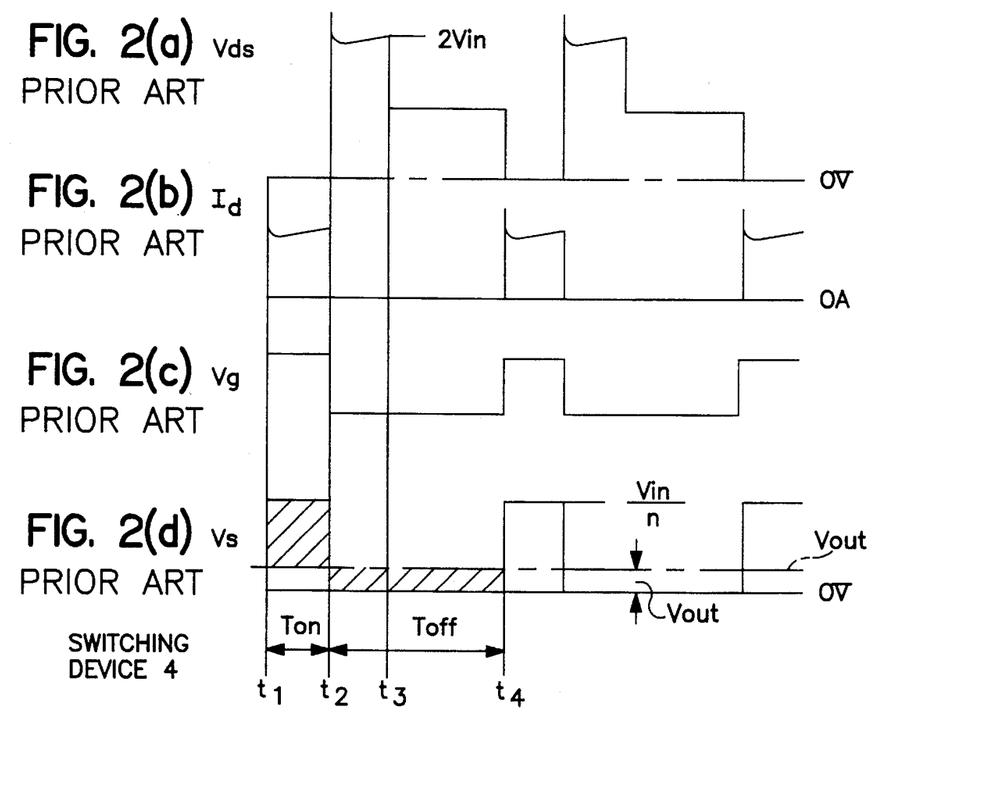
FIG. 2 illustrates waveforms in a switching power supply shown in FIG. 1.

As the output voltage Vout is a mean value of the voltage Vs, $$Vout = [Ton/(Ton+Toff)] \times (Vin/n),$$

where Ton and Toff is an on-period and an off-period of the switching device 4, respectively.

Thus, regulation of the output voltage is possible by changing the on/off ratio of the switching device 4.

FLYBACK type

Figure 3:
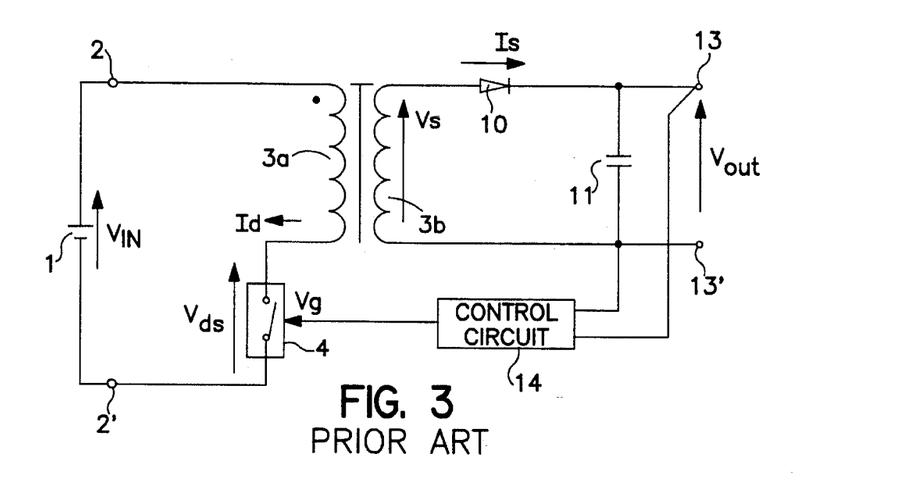
FIG. 3 is a circuit diagram of a second example of a switching power supply in accordance with the prior art.

FIG. 3 is a circuit diagram of a "Flyback type" switching power supply in accordance with the prior art. In FIG. 3, the components which have the same functions as those in FIG. 1 have the same number and their descriptions are omitted.

Figures 4A, 4D:
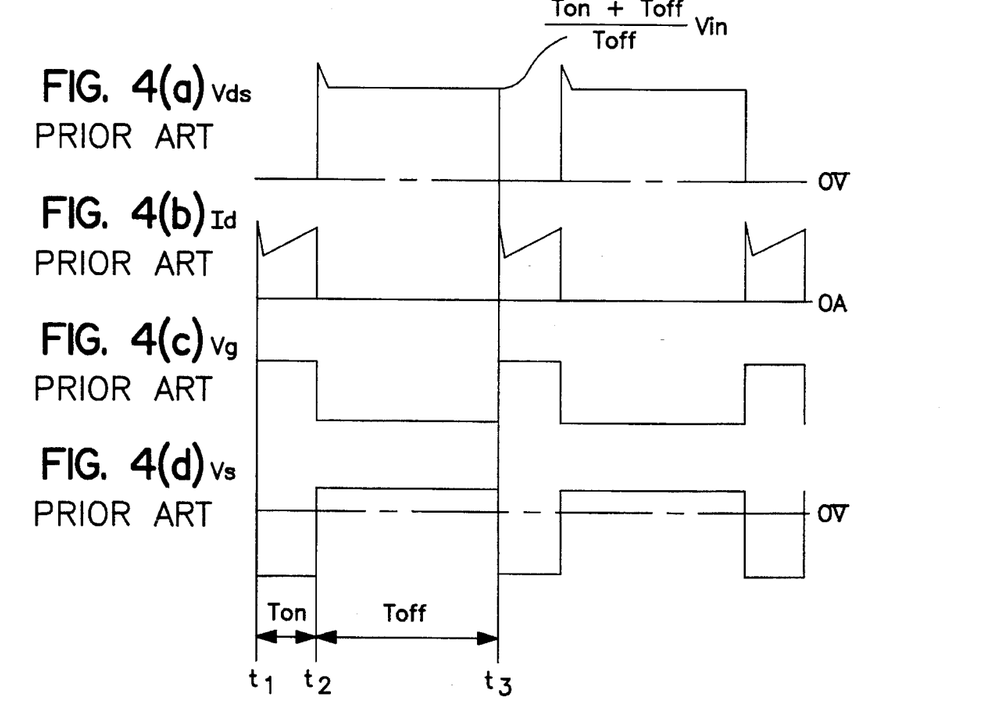
FIG. 4 illustrates waveforms in a switching power supply shown in FIG. 3.

FIG. 4 (a) to (d) illustrate waveforms in the switching power supply shown in FIG. 3.

(a) is a voltage waveform Vds across the switching device 4, (b) is a current waveform Id flowing in the switching device 4, (c) is an on/off signal Vg from the control circuit 14, which controls the switching device 4, and (d) is a voltage waveform Vs which is induced across the secondary winding 3b.

When the switching device 4 turns to on at the time t1 by the on/off signal Vg, a spike current flows in the switching device 4. This is due to a charging and discharging current to a distributed capacitance such as interwinding capacitance and interlayer capacitance and due to a discharging current of a parasitic capacitance which relates to the switching device 4. This spike current induces increased noise, decreased reliability and increased power loss.

When the switching device 4 is on, the voltage across the switching device 4 Vds is small enough and the input voltage Vin is applied to the primary winding 3a of the transformer 3. And a voltage (Vin/n) is induced across the secondary winding 3b and the diode 10 is biased inversely and becomes off. Consequently, the exciting current of the transformer 3 flows in the primary winding 3a increasingly. Here, n is a turn-ratio of the primary winding 3a to the secondary winding 3b.

When the switching device 4 turns to off by the on/off signal Vg at the time t2, a spike voltage due to a leakage inductance of the transformer 3 is induced. This spike voltage causes noise and power loss.

And a flyback pulse is induced across the secondary winding 3b and the diode 10 becomes on and is clamped at the output voltage Vout which is held in the capacitor 11. The voltage (Vin+n×Vout) is applied across the switching device 4. When the switching device 4 turns to on by the on/off signal at the time t3, the d-c source voltage Vin is applied across the primary winding 3a. The voltage (Vin/n) is induced across the secondary winding 3b and the diode 15 turns to off.

The output voltage Vout is expressed as follows.

$$Vout=(Ton/Toff)\times(Vin/n),$$

where Ton is an on-period and Toff is an off-period of the switching device 4. Thus, a regulation of the output voltage is possible by changing an on/off ratio of the switching device 4.

However, in the prior art, both in a forward type and in a flyback type, a spike current is induced when the switching device 4 turns to on, a spike voltage is induced when the switching device 4 turns to off, and a recovery is generated when the diode 16 or 10 turns to off. This is a problem because the spike current, the spike voltage, and a diode recovery make noise, and give some interference to electronic apparatus and make some power losses.

SUMMARY OF THE INVENTION

The present invention relates to a switching power supply which includes a circuit configuration including: a series connection of a first switching means and a second switching means, each of which exhibits on/off action according to specified timing of signals from a control circuit, connected across a d-c source, a series connection of a first capacitor, a primary winding of a transformer having one or more secondary windings, and an inductor, if necessary, connected in parallel with the second switching means, and a rectifying/filtering means connected in parallel with said secondary windings. A DC output is taken from the secondary windings through the rectifying/filtering means while the second switching means is on.

Either the first capacitor or the second capacitor, a leakage inductance of the transformer or an external inductor connected between said first capacitor and the primary winding of the transformer make a series resonance in a closed circuit composed of the first capacitor, the primary winding of the transformer, and the second switching device. Another resonance in a closed circuit is composed of the first capacitor and the primary winding of the transformer, the first switching device, and the d-c source.

According to the present invention, as the primary circuit of the transformer is switched at zero potential, there is no generation of spike voltage or spike current. As current flowing in the secondary winding of the transformer and the rectifying diode connected to the secondary winding becomes sinusoidal, turn-off current of the rectifying diode can be made very small, and turn-off recovery can be made very small, too. Thus, noise interference to electronic apparatus and power loss in the switching power supply can be made very small.

DETAILED DESCRIPTION OF THE INVENTION (First exemplary embodiment)

Figure 5:
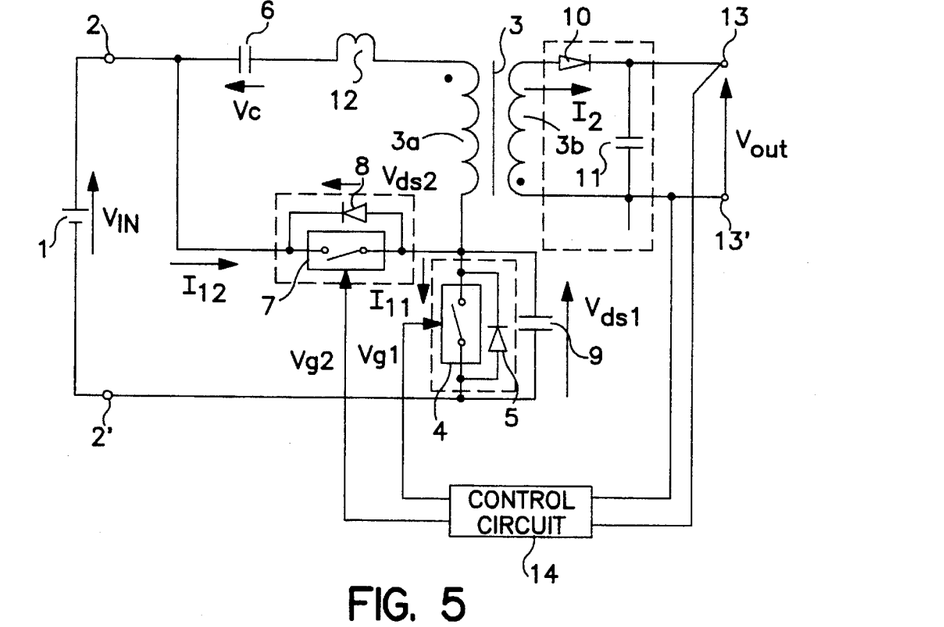
FIG. 5 is a circuit diagram of a switching power supply in accordance with an exemplary embodiment of the present invention.

An exemplary embodiment of the present invention is illustrated by FIG. 5 and FIG. 6(a)–(g). FIG. 5 shows a circuit diagram of the switching power supply. In FIG. 5 is a d-c source, the terminals 2 and 2' of the d-c source 1 are a positive side and a negative side, respectively. 3 is a transformer having a primary winding 3a and a secondary winding 3b. The secondary winding is wound with an opposite polarity to the primary winding 3a. A first switching means is composed of a parallel connection of a first switching device 4 and a first diode 5. A second switching means is composed of parallel connection of a second switching device 7 and a second diode 8. 6 is a first capacitor. A second capacitor 9 is connected in parallel with at least one of the first switching device 4, and the second switching means 7, suppresses a steep surge voltage across the first switching device 4 and the second switching device 7. 10 is a rectifying diode and 11 is a filtering capacitor. 12 is a circuit inductance composed of at least one of a leakage inductance of the primary winding 3a and an externally connected inductor. A first capacitor 6 and the circuit inductance make a resonance and this resonance makes a current waveform of the diode 10 sinusoidal. The external inductor is added when the circuit inductance is insufficient to obtain a desired resonance period using only the leakage inductance of the transformer. 13 and 13' are output terminals. 14 is a control circuit, which varies an on/off ratio of the first switching device 4 and the second switching device 7 in each specified timing.

FIG. 6(a) to (g) illustrate waveforms in the switching power supply shown in FIG. 5.

Figure 6A:
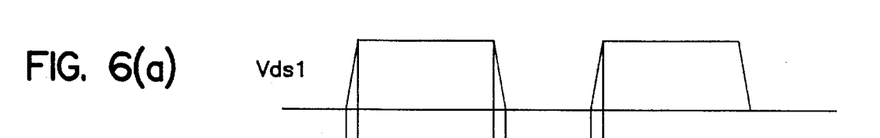
FIG. 6 illustrates waveforms in a switching power supply shown in FIG. 5.

(a) is a voltage waveform Vdsl across the first switching device 4.

Figure 6B:
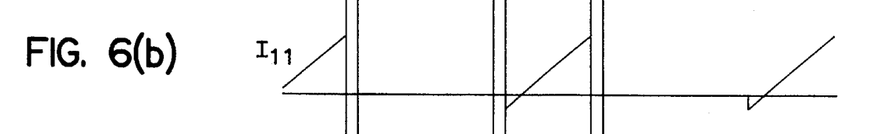

(b) is a waveform of the current Il1 flowing in the first switching device 4 or the first diode 5 (not including the capacitor 9).

Figure 6C:
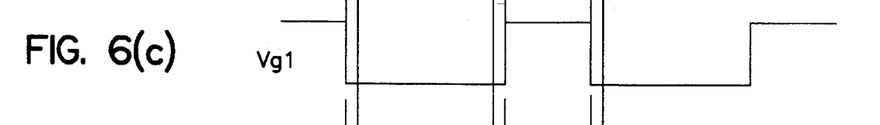

(c) is a waveform of the voltage Vg1 from the control circuit 14 and it controls the first switching device 4.

Figure 6D:
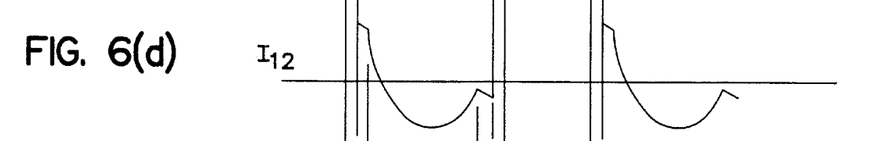

(d) is a waveform of the current I12 flowing in the second switching device 7 or the second diode 8.

Figure 6E:
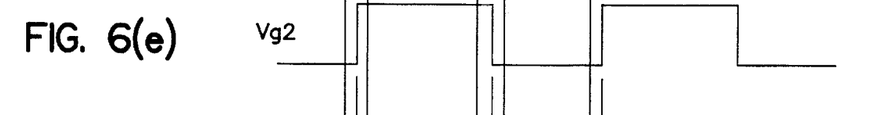

(e) is a waveform of th driving voltage Vg2 from the control circuit 14 and it controls the second switching device 7.

Figure 6F:
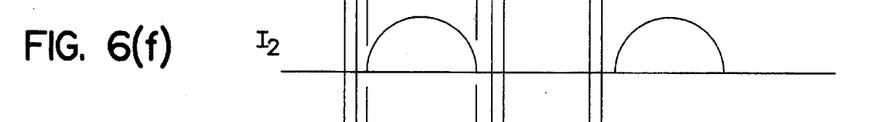

(f) is a waveform of the current I2 flowing in the secondary winding 3b.

Figure 6G:
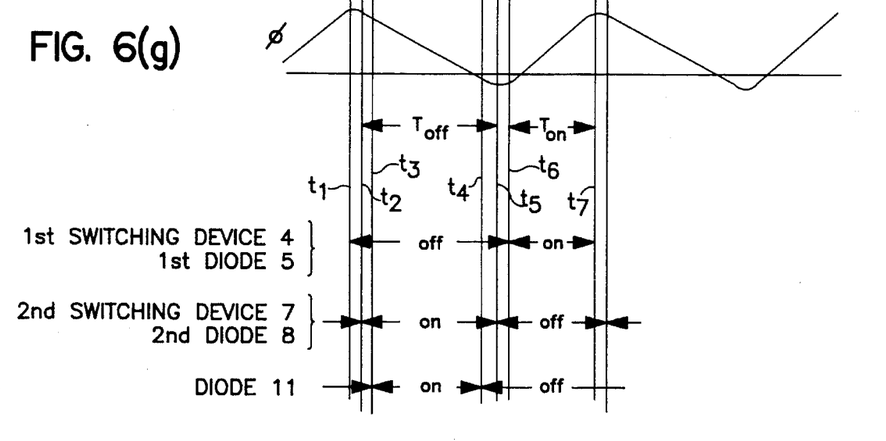

(g) ia a waveform of the magnetic flux of the transformer 3. (t1–t2): When the first switching device 4 turns to off at the time t1, while the second switching device 7 is off, the second capacitor 9 is charged by an exciting current of the primary winding 3a and the voltage Vdsl across the first switching device 4 increases gradually.

(t2–t3): When the voltage Vdsl across the first switching device 4 increases higher than the d-c source voltage Vin at the time t3, the second diode 8 gets conductive and an exciting energy stored in the primary winding 3a is released through the second diode 8, the first capacitor 6 and the leakage inductance or the external inductor 12 of the primary winding 3a. Here, as the current flowing in the primary winding 3a is continuous, there is no generation of a spike voltage due to a leakage inductance of the transformer 3.

(t3–t4): When the voltage Vc across the first capacitor 6 increases and the induced voltage across the secondary winding 3b becomes higher than the output voltage Vout, the rectifying diode 10 is forwardly biased and turns to on. The energy stored in the primary winding 3a is released through the second diode 8, the first capacitor 6 and the leakage inductance or the external inductor 12 of the primary winding 3a. This current is I12. And the induced current I2 in the secondary winding 3b is filtered by the filtering capacitor 11 and the d-c voltage Vout is obtained across the output terminals 3 and 3'.

(t2–t5): When the second switching device 7 turns to on, the primary current I12 flows through either the second diode 8 or the second switching device 7, but the performance is the same even if the primary current I12 flows in either one. Here, the voltage across the first switching device 4 is just the d-c source voltage Vin, (although in the prior art, the voltage across the switching device 4 was (2×Vin), in a forward type and $[(Ton+Toff)/Toff] \times Vin$, in a flyback type.

(t3–t4): At the time t2, the second current I2 increases from zero. As the second diode 8 is on, a resonance generates in a closed loop composed of the transformer 3, the second switching device 7, the first capacitor 6, and the leakage inductance or the external inductor 12. The resonance period depends on the first capacitor 6 and the leakage inductance or the external inductor 12 and. The waveform of the secondary current I2 becomes sinusoidal due to a resonance, as shown in FIG. 6 (f).

Here, as the transformer 3 releases its stored energy at the state that the voltage Vc across the first capacitor 6 is applied to the primary winding 3a, the magnetic flux decreases linearly. The secondary current I2 becomes a sum of the exciting current inducing the magnetic flux and the primary current which is a resonance current. As the resonance period of the current becomes small enough, the period during which secondary current I2 decreases and soon becomes zero and it makes the rectifying diode 10 off.

In the primary winding 3a, a sinusoidal resonance current flows during the rectifying diode 10 is on, i.e. (t3–t4), but when the rectifying diode 10 turns to off at the time t4, the resonance current becomes zero and only the exciting current flows.

(t4–t5): At that time, the primary current becomes negative, but as the second switching device 7 is on, the resonance is maintained and the discharging current from the first capacitor 6 to the primary winding 3a through the second switching device 7. Even after the energy stored in the transformer 3 during the first switching device 4 is on is released, the transformer 3 is excited reversely and energy is stored in the reverse direction there, because the d-c voltage Vc across the first capacitor 6 is applied across the primary winding 3a through the second switching device 7.

(t5–t6): In this period, both the first switching means and the second switching means are off. When the second switching device 7 turn to off at the time t5, the second capacitor 9 is discharged by the reverse exciting energy of the transformer 3 and the voltage Vdsl across the first switching device 4 decreases gradually. The voltage across each winding 3a and 3b of the transformer 3 turns its polarity, that is, the first switching device side of the primary winding 3a is made negative and the first capacitor side of the primary winding 3a is made positive by the induced voltage in the primary winding 3a, Therefore, the primary current Il1 flows to charge the d-c source 1 through the first diode 5 and the energy stored in the transformer 3 during the off-period is fed back to the d-c source 1.

(t6–t7): During the period t6 to t7, the first switching device 4 is on and the second switching device 7 is off, the voltage difference (Vin–Vc) between the the d-c source voltage Vin and the voltage Vc held in the first capacitor 6 is applied to the primary winding 3a, flux is induced in the transformer 3 by the primary current Il1 flowing in the primary winding 3a and energy due to the magnetic flux is stored. A voltage is also induced in the secondary winding 3b with a polarity that the rectifying diode 10 is reversely biased, the second diode 8 is also reversely biased, and the second switching device 7 is off. Here, the voltage across the second switching device 7 is just the d-c source voltage Vin (not higher than Vin).

When the first switching device 4 is turned to on by an on/off signal from the control circuit 14, the primary current Il1 flows through either the first diode 5 or the first switching device 4.

But the performance is the same even if the primary current Il1 flows through either one.

When all the energy stored in the transformer 3 during the off-period, is released and the primary current becomes zero, the primary current Il1 flows in the primary winding 3a in the opposite direction to that above mentioned from the d-c source through the first switching device and a flux is induced in the transformer 3, where energy is stored.

In this state the polarity of the induced voltage across the primary winding 3a does not change and the first switching device 4 holds on according to an on/off signal from the control circuit 14. When the first switching device 4 turns to off according to a signal from the control circuit 14, the stored energy in the transformer 3 charges the second capacitor 9 through the primary winding 3a. Although the turn-on timing of the second diode 8 and the turn-on timing of the rectifying diode 10 may interchange each other depending on the load current, there is no problem in the performance of the current resonance.

If an on-period of the first switching device 4 or the first diode 5 is Ton, an on-period of the second switching device 7 or the second diode 8 is Toff, and the periods which all the switching devices and diodes are off, (t1–t2) and (t5–t6), are neglected, the following equation is derived from a reset condition of a flux in the primary winding 3a.

$$(Vin-Vc) \times Ton = Vc \times Toff$$

Therefore, the voltage Vc across the first capacitor 6 is $$Vc = [Ton/(Ton+Toff)] \times Vin$$

And if the turn-ratio between the primary winding 3a and the secondary winding 3b is (n to 1), the d-c output voltage is $$\begin{aligned} Vout &= Vc/n \\ &= [Ton/(Ton+Toff)] \times (Vin/n) \end{aligned}$$

Thus, the d-c output voltage can be controlled by varying the on/off ratio of the first switching device 4 and the second switching device 7.

As being described above as the current of the rectifying diode 10 can be a resonance waveform, switching can be made at the state which the current is zero and the turn-off current of the second switching means can be made small and switching loss at turn-off can be made small. Moreover, as the voltage waveforms applied to the first switching device 4 and the second switching device 7 are not steep, a merit can be obtained that a generation of noise and switching loss in the first switching device 4 and in the second switching device 7 is suppressed. And as the first capacitor 6 and the second diode 8 work as a clamping circuit, there is no generation of a surge voltage based on the turn-off of the first switching device 4 shown in the prior art. This is a merit, too.

As both the voltages applied across the first switching device 4 and the second switching device 7 are not higher than the d-c source voltage Vin, a lower voltage design is possible compared with the prior art.

(Second exemplary embodiment)

Figure 7:
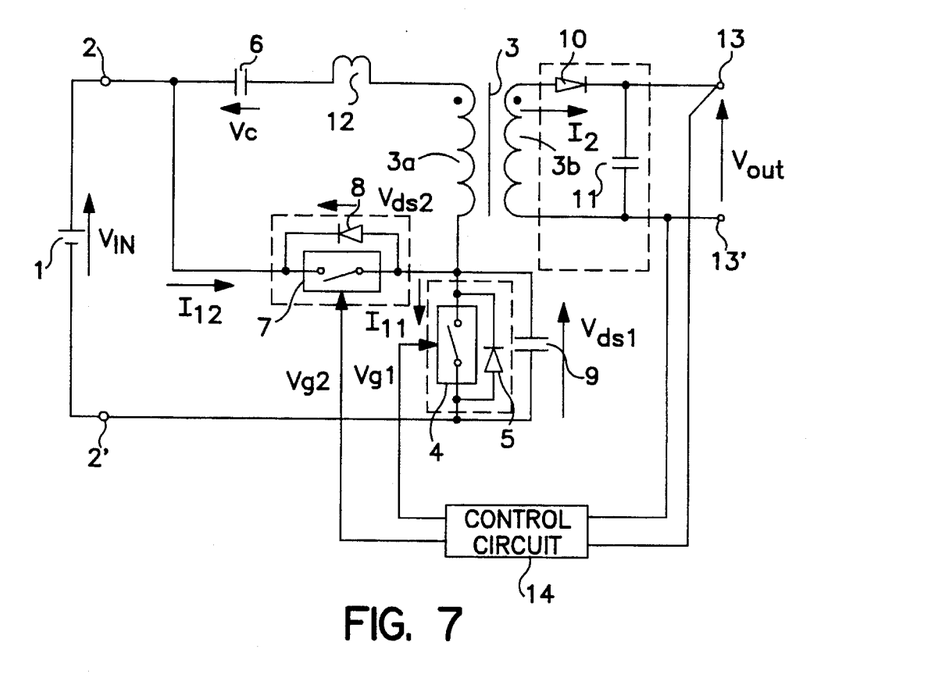
FIG. 7 is a circuit diagram of a switching power supply in accordance with another exemplary embodiment of the present invention.

Another exemplary embodiment of the present invention is illustrated by FIG. 7 and FIG. 8(a)–(g). FIG. 7 shows a circuit diagram. The secondary winding 3b of the transformer 3 is wound with the same polarity as the primary winding.

FIG. 8 (a) to (g) illustrate waveforms in the switching power supply shown in FIG. 7.

Figure 8A:
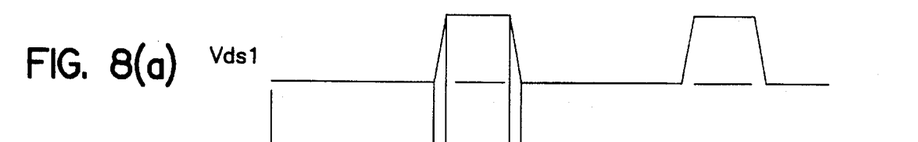
FIG. 8 illustrates waveforms in a switching power supply shown in FIG. 7.

(a) is a voltage waveform Vds1 across the first switching device 4.

Figure 8B:
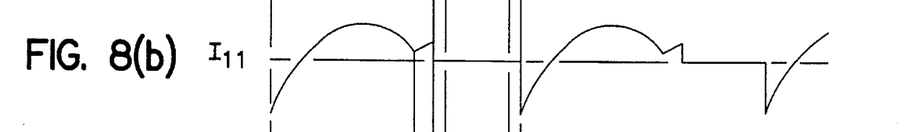

(b) is a waveform of the current Il1 flowing in the first switching device 4 or the first diode 5 (not including the capacitor 9).

Figure 8C:
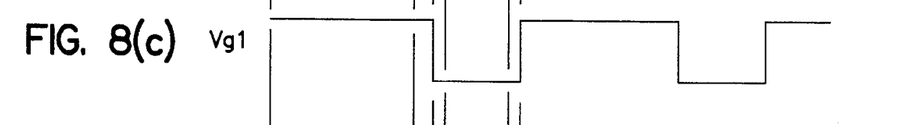

(c) is a waveform of the voltage Vg1 from the control circuit 14 and it controls the first switching device 4.

Figure 8D:
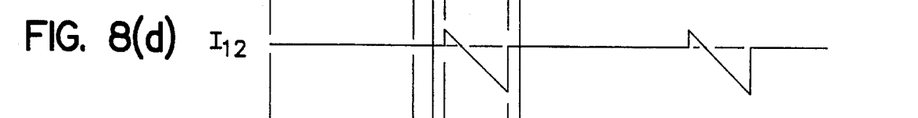

(d) is a waveform of the current Il2 flowing in the second switching device 7 or the second diode 8.

Figure 8E:
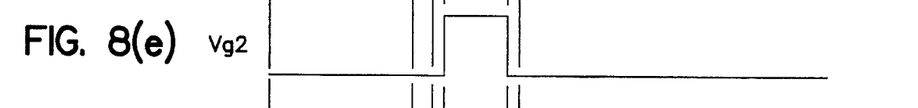

(e) is a waveform of the voltage Vg2 from the control circuit 14 and it controls the second switching device 7.

Figure 8F:
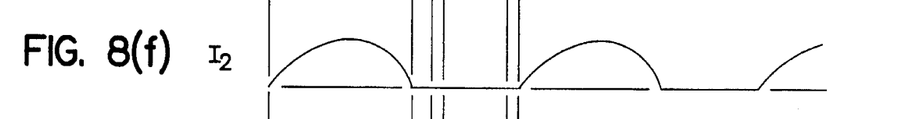
Figure 8G:
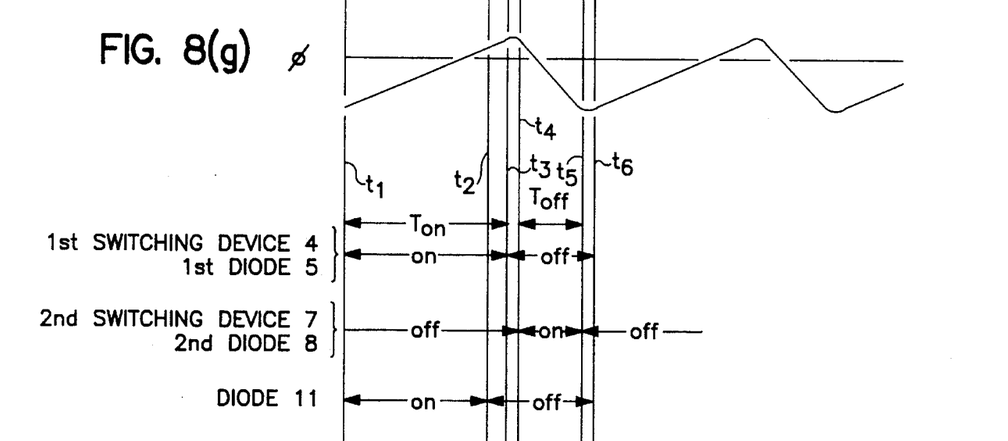

(f) is a current I2 flowing in the secondary winding 3b. ( g) ia s waveform of a magnetic flux-of the transformer 3.

(t1–t2): During the period (t1 to t2), the first switching device 4 is on and the second switching device 7 is off, being controlled by an on/off signal from the control circuit 14. So the d-c source voltage is applied to the primary winding 3a through the first capacitor 6 and the voltage across the primary winding 3a becomes (Vin–Vc), where Vc is the voltage across the first capacitor 6. By the current Il1 flowing in the primary winding 3a, a magnetic flux is induced in the transformer 3 and energy is stored therein. A voltage is induced in the secondary winding 3b, which turns the rectifying diode 10 to on, and an output current I2 flows. The induced voltage is filtered by a filtering capacitor 11 and supplied to an output terminals 13 and 13'.

The first capacitor 6 and the circuit inductance 12 make a resonance. As the resonance period becomes small enough, a waveform of the output current becomes sinusoidal. The waveform rises up from zero at t1 and falls down to zero again at t2. Therefore, the rectifying diode 19 works as a zero current switch and there is no generation of a voltage recovery.

During this period, the voltage across the second switching device 7 and the second diode 8 is just (not higher than) the d-c source voltage Vin. In the primary winding 3a, a sum current of an exciting current and a current converted from the secondary to primary flows.

t3: When the first switching device 4 turns to off at t3 by a signal from the control circuit 14, the second capacitor 9 is charged by an exciting energy of the transformer 3 and the voltage Vds1 across the first switching device 4 increases gradually. When a flyback pulse is induced in the primary winding 3a and the second diode 8 is forwardly biased, an energy stored in the transformer 3 is released as a primary current Il2 through the primary winding 3a and the second capacitor 8 and supplied as a d-c voltage Vc across the first capacitor 6, after being filtered by the first capacitor 6.

t4: When the second switching device 7 is turned to on by the signal from the control circuit 14 at t4, the primary current Il2 flows through either the second diode 8 or the second switching device 7. But the performance is the same even if the primary current Il2 flows in either one. Here, as a flyback voltage is induced also in the secondary winding 3b and the rectifying diode 10 is reversely biased, the rectifying diode 10 becomes off and a current is not supplied to the output. Although the voltage Vc is a sum of a d-c voltage and a resonance voltage which varies its amplitude time by time, he latter can be settled small enough. During the period (t4 to t5), he voltage across the first switching device 4 is just the d-c source voltage Vin (not higher than Vin), because the first switching device 4 is off and the second switching device 7 is on.

When the second switching device 7 is turned to off by a signal from the control circuit 14 at the time t5, the voltage induced in each winding 3a and 3b turns its polarity, that is, the first switching device side of the primary winding 3a is made negative and the first capacitor side of the primary winding 3a is made positive by the induced voltage in the primary winding 3a, Therefore, the current Il1 flows to charge the d-c source 1 through the first diode 5 and the energy stored in the transformer 3 during the off-period is fed back to the d-c source 1.

t6=t1: When the first switching device 4 is turned to on by a signal from the control circuit 14, the primary current Il1 flows through either the first diode 5 or the first switching device 4. But the performance is the same, even if the primary current Ill flows either one.

When all the energy stored in the transformer 3 during the off-period is released and the primary current becomes zero, the current Ill flows in the primary winding 3a in the opposite direction to that mentioned above from the d-c source 1 through the first switching device and a flux is induced in the transformer 3, where energy is stored. In this state the polarity of the induced voltage across the primary winding 3a does not change and the first switching device 4 holds on according to the on/off signal from the control circuit 14. By the repeating above mentioned actions, a d-c voltage is supplied to the output terminals 13 and 13'. Although the turn-on timing of the second diode 8 and the turn-on timing of the rectifying diode 10 may interchange each other depending on the load current, there is no problem in the performance of the current resonance.

If an on-period of the first switching device 4 or the first diode 5 is Ton, an on-period of the second switching device 7 or the second diode 8 is Toff, and the periods (t3–t4) and (t5–t6), which all the switching devices and diodes are off, are neglected, the following equation is derived from a reset condition of a magnetic flux in the primary winding 3a.

$$(Vin-Vc) \times Ton = Vc \times Toff$$

Therefore, the voltage Vc across the first capacitor 6 is, $$Vc = [Ton/(Ton+Toff)] \times Vin$$

And if the turn-ratio between the primary winding 3a and the secondary winding 3b is (n to 1), the d-c output voltage is, $$\begin{aligned} Vout &= (Vin - Vc)/n \\ &= [Toff/(Ton + Toff)] \times (Vin/n) \end{aligned}$$

Thus, the d-c output voltage can be controlled by varying the on/off ratio of the first switching device 4 and the second switching device 7.

As described above, as the current of the rectifying diode 10 comes to have a resonance waveform, switching can be made at the state at which the current is zero and the turn-off current of the second switching means can be made small and switching loss at turn-off can be made small. Moreover, as the voltage waveforms applied to the first switching device 4 and the second switching device 7 are not steep, a merit can be obtained that interference noise and switching loss in the first switching device 4 and the second switching device 7 are suppressed. And as the first capacitor 6 and the second diode 8 work as a clamping circuit, there is no generation of a surge voltage based on a turn-off of the first switching device 4 shown in the prior art. This is one of the merits, too. As both the voltages applied across the first switching device 4 and the second switching device 7 are not higher than the d-c source voltage Vin, a lower voltage design is possible compared with the prior art.

Here, it is described that the second capacitor 9 is connected in parallel with the first switching device 4 but it may be connected in parallel with the second switching device 7 or with both the first and the second switching devices 4 and 7.

According to the present invention, when the first and the second switching devices are turned on, these switching devices are turned on after releasing energy stored in parastic capacitances of these switching devices and in distributed capacitance of the transformer. Therefore, there is no genaration of spike current. And when the first and the second switching devices 4 and 7 are turned off, there is no generation of spike voltage due to leakage inductance of the transformer.

Moreover, a current flowing in the transformer is always continuous and variations of the on-period and off-period of the switching devices due to a load condition are suppressed. And as the rectifying diode can be switched at zero current due to current resonance, there is no turn-off recovery voltage in the rectifying diode, turn-off current of the switching devices can be made small, and the turn-off switching loss can be made small.

The invention may be embodied in-other specific form without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed:

1. A switching power supply circuit comprising:

first switching means and second switching means connected in series across a d-c source, each of said first switching means and said second switching means repeatedly turned on and off inversely to each other according to a respective one of a plurality of timing signals generated by a control circuit wherein said first switching means and said second switching means each include a switching device and a diode connected in parallel with said switching device;

a series connection of a first capacitor and a primary winding of a transformer, said transformer having at least said primary winding and at least one secondary winding, connected in parallel with said second switching means; and rectifying/filtering means connected in parallel with said secondary winding, wherein a d-c output signal is received from said secondary windings and through said rectifying/filtering means while said second switching means is on, the output voltage is substantially dependent upon the on/off ratio of said first switching means and the turn ratio of said transformer and substantially independent of the impedance of said capacitor and circuit inductance, resonance of said first capacitor and said circuit inductance is provided in a closed circuit comprising said first capacitor, at least one of a leakage inductance of said transformer and an externally connected inductor, said primary winding of said transformer, and said second switching means, and resonant current flows in said primary winding and secondary winding of said transformer.

2. A switching power supply as recited in claim 1, wherein a second capacitor is connected in parallel with at least one of the first switching means and the second switching means, and timing signals generated by a control circuit have a period while both said first switching means and said second switching means are off.

3. A switching power supply as recited in claim 1, wherein;

$$Vout=[Ton/(Ton+Toff)] \times (Vin/n),$$

where Vout is the output voltage, Ton is the on period of said first switching means, Toff is the on period of said second switching means, Vin is the voltage provided by said d-c source, and n is the turn ratio of said transformer.

4. A switching power supply circuit comprising:

first switching means and second switching means connected in series across a d-c source, each of said first switching means and said second switching means repeatedly turned on and off inversely to each other according to a respective one of a plurality of timing signals generated by a control circuit wherein said first switching means and said second switching means each include a switching device and a diode connected in parallel with said switching device;

a series connection of a first capacitor and a primary winding of a transformer, said transformer having at least said primary winding and at least one secondary winding, connected in parallel with said second switching means; and a rectifying/filtering means connected in parallel with at least one of said plurality of secondary windings, wherein a d-c output signal is received from said secondary windings and through said rectifying/filtering means while said first switching means is on, the output voltage is substantially dependent upon the on/off ratio of said first switching means and the turn ratio of said transformer and substantially independent of the impedance of said capacitor and circuit inductance, resonance of said first capacitor and said circuit inductance is provided in a closed circuit comprising said first capacitor, at least one of a leakage inductance of said transformer and an externally connected inductor, said primary winding of said transformer and said first switching means, and said d-c source, and resonant current flows in said primary winding and secondary winding of said transformer.

5. A switching power supply as recited in claim 4, wherein a second capacitor is connected in parallel with at least one of the first switching means and the second switching means, and timing signals generated by a control circuit have a period while both said first switching means and said second switching means are off.

6. A switching power supply as recited in claim 4, wherein;

$$Vout = [Toff/(Ton+Toff)] \times (Vin/n),$$

where Vout is the output voltage, Ton is the on period of said first switching means, Toff is the on period of said second switching means, Vin is the voltage provided by said d-c source, and n is the turn ratio of said transformer.

* * * * *

UNITED STATES PATENT AND TRADEMARK OFFICE
CERTIFICATE OF CORRECTION

PATENT NO. : 5,490,052
DATED : February 6, 1996
INVENTOR(S) : Koji Yoshida et al.

It is certified that error appears in the above-indentified patent and that said Letters Patent is hereby corrected as shown below:

Column 10, claim 1, line 46, after "inductance" insert --in said switching power supply circuit--.

Column 12, claim 4, line 2, after "inductance" insert --in said switching power supply circuit--.

Signed and Sealed this

Eleventh Day of February, 1997

Attest:

BRUCE LEHMAN

*Attesting Officer*  *Commissioner of Patents and Trademarks*